(12) United States Patent
Sakane et al.

(10) Patent No.: US 8,350,436 B2
(45) Date of Patent: Jan. 8, 2013

(54) OUTER-ROTOR SALIENT-POLE CONCENTRATED WINDING MOTOR

(75) Inventors: Kenta Sakane, Wako (JP); Ken Kitaori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 13/192,465

(22) Filed: Jul. 28, 2011

(65) Prior Publication Data

US 2012/0025661 A1 Feb. 2, 2012

(30) Foreign Application Priority Data

Jul. 30, 2010 (JP) .................................. 2010-172346

(51) Int. Cl.
  *H02K 3/46* (2006.01)
  *H02K 1/18* (2006.01)
(52) U.S. Cl. .......................... 310/194; 310/179; 310/208
(58) Field of Classification Search ................ 310/49 R, 310/194, 215, 179, 208, 254
See application file for complete search history.

(56) References Cited

U.S. PATENT DOCUMENTS

| 5,852,335 A * | 12/1998 | Suzuki et al. ............... 310/254.1 |
| 7,126,246 B2 * | 10/2006 | Izumi et al. .................... 310/208 |
| 2004/0000830 A1 * | 1/2004 | Gomyo et al. ................ 310/179 |

FOREIGN PATENT DOCUMENTS

JP 2002-315250 10/2002

* cited by examiner

*Primary Examiner* — Tran N. Nguyen
*Assistant Examiner* — Leda Pham
(74) *Attorney, Agent, or Firm* — Ditthavong Mori & Steiner, P.C.

(57) ABSTRACT

An outer-rotor salient-pole concentrated winding motor includes a salient-pole concentrated winding stator and a rotor. The salient-pole concentrated winding stator includes stator core, coils and insulators. The stator core has a plurality of teeth that extend outward in a radial direction of the stator. Each of the insulators includes a projecting engaging portion and a recessed engaging portion. The projecting engaging portion projects outward in the circumferential direction. The recessed engaging portion is formed so that an outer separation wall of the insulator is recessed inward in the circumferential direction. The projecting engaging portion and the recessed engaging portion of adjacent insulators engage with each other when the teeth are inserted into the insulators.

5 Claims, 11 Drawing Sheets

OUTER-ROTOR SALIENT-POLE CONCENTRATED WINDING MOTOR

CROSS-REFERENCE TO RELATED APPLICATIONS

The present application claims priority under 35 U.S.C. §119 to Japanese Patent Application No. 2010-172346, filed Jul. 30, 2010, entitled "Outer-Rotor Salient-Pole Concentrated Winding Motor". The contents of this application are incorporated herein by reference in their entirety.

BACKGROUND OF THE INVENTION

1. Field of the Invention

The present invention relates to an outer-rotor salient-pole concentrated winding motor.

2. Description of the Related Art

Japanese Unexamined Patent Application Publication No. 2002-315250, for example, discloses a stator of an outer-rotor salient-pole concentrated winding motor. The stator includes steel plates stacked in a stacking direction and having lugs that project outward in the stacking direction from the outermost steel plates at positions near the bottom portions of slots formed between the adjacent teeth. Crossover wires are arranged outside the lugs to prevent the crossover wires from moving inward in the radial direction of the stator and entering between attachment surfaces for attaching the stator. Thus, the assemblability of the stator is increased.

Similar to the stator described in Japanese Unexamined Patent Application Publication No. 2002-315250, a stator of an outer-rotor salient-pole concentrated winding motor generally includes teeth which have projections provided at the outer periphery of the teeth so as to project in the circumferential direction and around which wires are wound. A stator is also known which includes a stator core having teeth without the projections in the circumferential direction and in which insulators having wires wound therearound are installed from the outer side in the radial direction of the stator core such that the teeth are inserted into the insulators.

SUMMARY OF THE INVENTION

According to one aspect of the present invention, an outer-rotor salient-pole concentrated winding motor includes a salient-pole concentrated winding stator and a rotor. The salient-pole concentrated winding stator includes stator core, coils and insulators. The stator core has a plurality of teeth that extend outward in a radial direction of the stator. Each of the coils has a winding portion, a first winding end and a second winding end. The winding portion is formed by annularly winding a wire into a layered structure. The first winding end is an end of the wire at an outer end of the winding portion in the radial direction of the stator. The second winding end is an end of the wire at an inner end of the winding portion in the radial direction of the stator. The insulators retain the coils and are connected to each other in an annular configuration such that the teeth are inserted into the insulators and such that the first winding end of one of the coils is connected to the second winding end of another of the coils with a crossover portion. The rotor includes a rotor holder and a rotor yoke. The rotor yoke is fixed to an inner peripheral surface of the rotor holder. The salient-pole concentrated winding stator and the rotor are arranged to face each other with a gap between the salient-pole concentrated winding stator and the rotor in the radial direction. Each of the insulators includes a body portion around which the wire is wound, an outer peripheral flange, an inner peripheral flange, an outer separation wall, a first crossover-portion retaining member, a second crossover-portion retaining member, a projecting engaging portion and a recessed engaging portion. The outer peripheral flange is provided at an outer end of the body portion in the radial direction. The inner peripheral flange is provided at an inner end of the body portion in the radial direction. The outer separation wall extends outward in the radial direction from an end of the outer peripheral flange in an axial direction. The first crossover-portion retaining member is provided on the outer separation wall and retains a part of the crossover portion located in a vicinity of the first winding end. The second crossover-portion retaining member is provided on the inner peripheral flange and retains a part of the crossover portion located in a vicinity of the second winding end. The projecting engaging portion is provided at one end of the outer separation wall in a circumferential direction and projects outward in the circumferential direction. The recessed engaging portion is provided at another end of the outer separation wall in the circumferential direction and is formed so that the outer separation wall is recessed inward in the circumferential direction. The projecting engaging portion and the recessed engaging portion of adjacent insulators among the insulators engage with each other when the teeth are inserted into the insulators.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

An outer-rotor salient-pole concentrated winding motor according to an embodiment of the present invention will now be described with reference to the accompanying drawings, wherein like reference numerals designate corresponding or identical elements throughout the various drawings. The drawings are to be viewed in the orientation of reference numerals.

Figure 1:
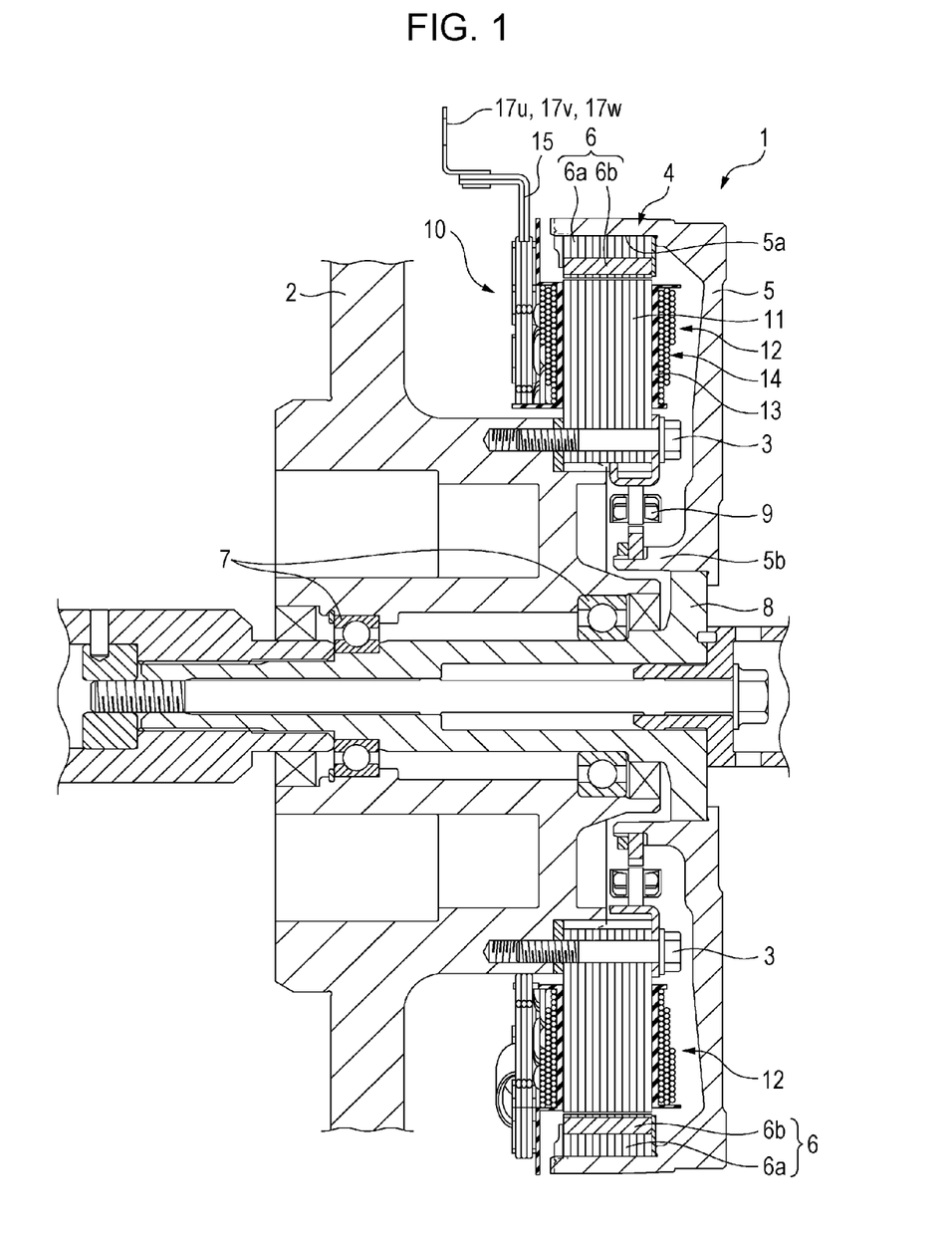
FIG. 1 is a sectional view of the main part of an outer-rotor salient-pole concentrated winding motor according to an embodiment of the present invention.

FIG. 1 is a sectional view of the outer-rotor salient-pole concentrated winding motor according to the embodiment of the present invention. Referring to FIG. 1, the motor according to the present embodiment is a three-phase, eight-pole outer rotor motor 1, and includes a stator 10 fixed with bolts 3 to a motor housing 2 and an annular rotor 4 arranged at the outer periphery of the stator 10 with a small gap therebetween in a radial direction.

The rotor 4 includes an annular rotor yoke 6 that includes a rotor core 6a formed by stacking magnetic steel plates and a magnet 6b that is embedded in the rotor core 6a. The rotor yoke 6 is fixed to an inner peripheral surface 5a of a rim portion of the support member 5, which is a disc-shaped rotor holder having the rim portion. The rotor 4 is fixed to a rotational shaft 8, which is rotatably supported by ball bearings 7 and 7 that are internally fitted to the motor housing 2, such that the rotor 4 can rotate together with the rotational shaft 8. The rotor 4 is rotated by a rotating magnetic field generated by the stator 10. A resolver 9 that detects a rotational speed of the rotational shaft 8 is arranged between a base portion 5b of the support member 5 and the stator 10.

Figure 2:
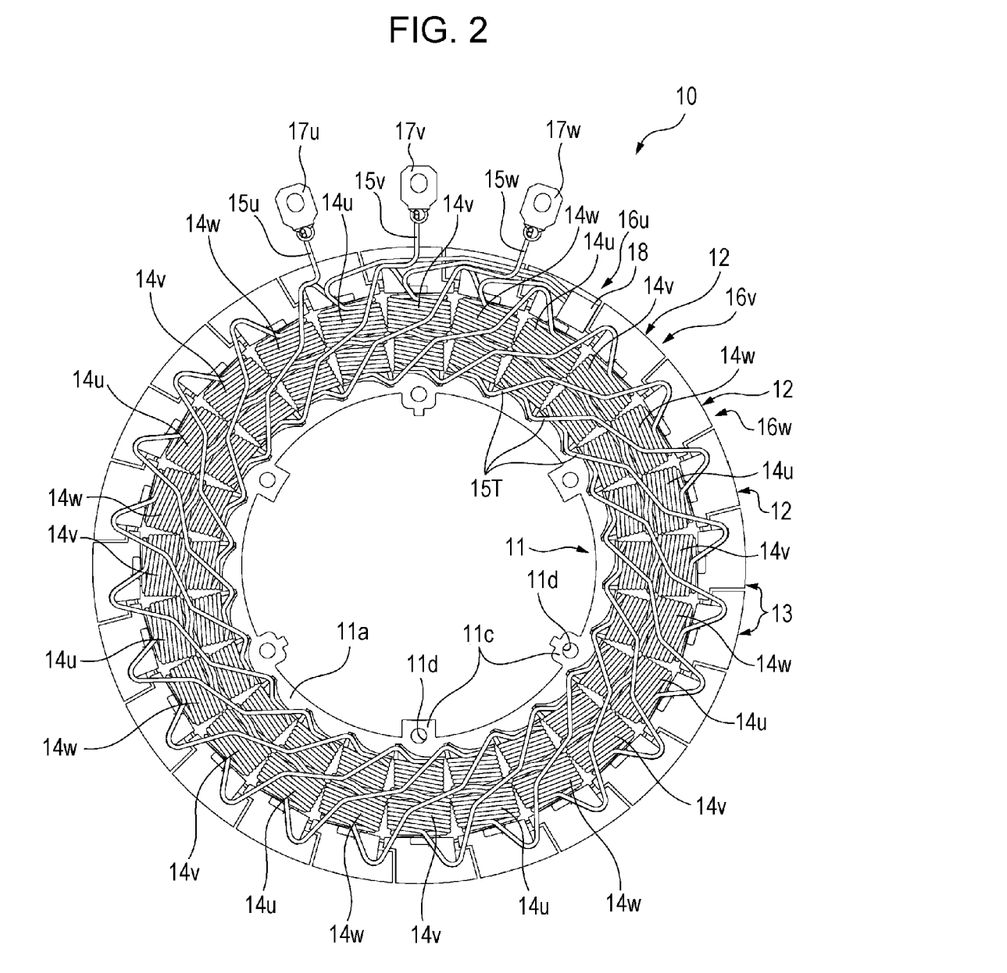
FIG. 2 is a front view of a stator illustrated in FIG. 1.
Figure 3:
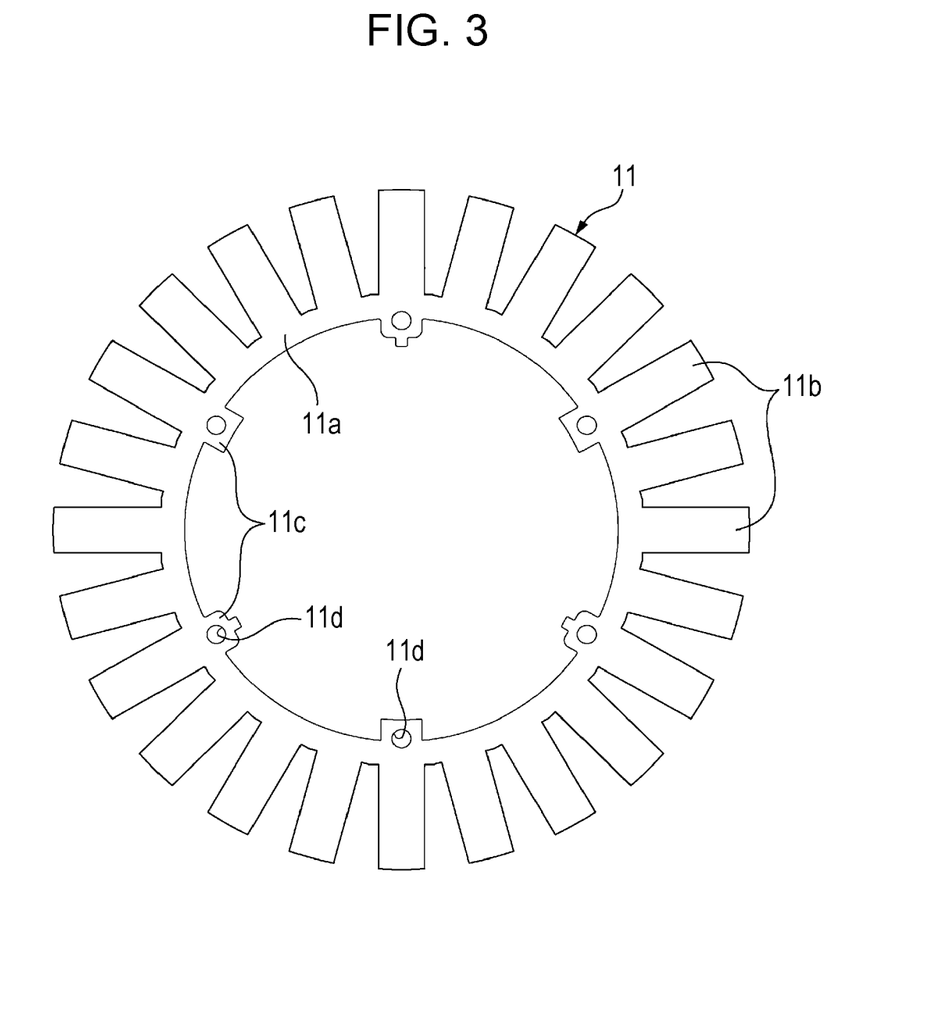
FIG. 3 is a front view of a stator core illustrated in FIG. 2.

As illustrated in FIGS. 2 and 3, the stator 10 includes a stator core 11 and twenty-four core pieces 12 that are connected to each other in an annular configuration. The stator core 11 is formed by stacking a plurality of magnetic steel plates in the axial direction of the stator 10, and includes an annular support portion 11a and twenty-four teeth 11b that project outward in the radial direction from the support portion 11a and that are arranged in the circumferential direction of the stator 10.

Six projections 11c having bolt holes 11d are provided on the inner peripheral surface of the support portion 11a of the stator core 11 with constant intervals therebetween in the circumferential direction. The stator 10 is fixed to the motor housing 2 by inserting the bolts 3 into the bolt holes 11d.

Figure 4:
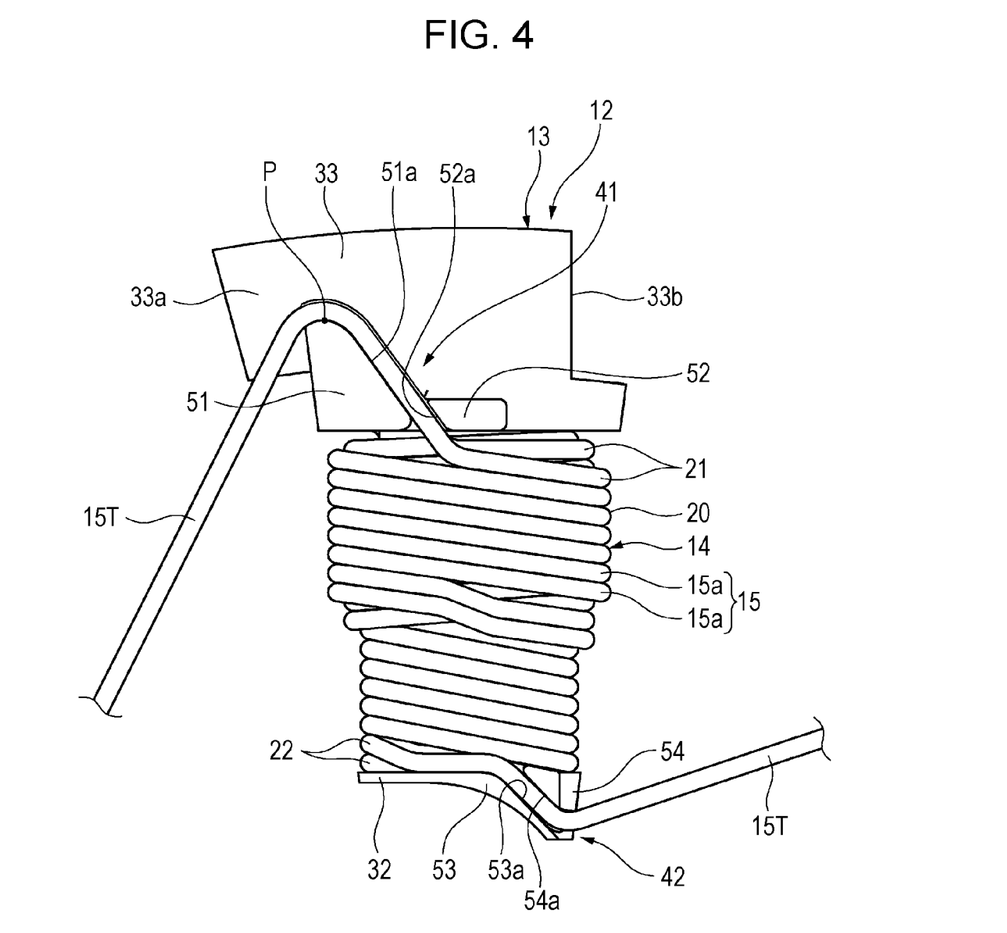
FIG. 4 is a front view of one of core pieces illustrated in FIG. 2.

Referring to FIG. 4, each core piece 12 includes an insulator 13 and a coil 14. The insulator 13 is formed of, for example, an insulating synthetic resin, and is attached into each tooth 11b of the stator core 11 such that the tooth 11b is inserted into the insulator 13. The coil 14 is formed by winding a wire bundle 15, which includes two wires 15a and 15a, around the insulator 13. Thus, the wire bundle 15 is wound around each tooth 11b of the stator core 11 in a salient-pole concentrated winding configuration.

Referring to FIG. 2, the coils 14 include eight coils for each of three phases, that is, eight U-phase coils 14u, eight V-phase coils 14v, and eight W-phase coils 14w. The coils 14 are provided on the teeth 11b of the stator core 11 such that the U-phase coils 14u, the V-phase coils 14v, and the W-phase coils 14w are arranged in that order in the circumferential direction of the stator 10. Thus, the coils 14 of the same phase (for example, the U-phase coils 14u) are connected to each other by crossover portions 15T of a single wire bundle 15 with the coils 14 of the other phases (for example, the V-phase coils 14v and the W-phase coils 14w) provided therebetween.

Referring to FIG. 2, each set of eight coils 14 for each phase (U-phase, V-phase, and W-phase coils 14u, 14v, and 14w) form a single coil group 16 (U-phase, V-phase, and W-phase coil groups 16u, 16v, and 16w). The eight coils 14 (U-phase, V-phase, and W-phase coils 14u, 14v, and 14w) included in each coil group 16 (U-phase, V-phase, and W-phase coil groups 16u, 16v, and 16w) are formed by continuously winding a single wire bundle 15 (U-phase, V-phase, and W-phase wire bundles 15u, 15v, and 15w).

An end of the U-phase wire bundle 15u of the U-phase coil group 16u is connected to a U-phase connection terminal 17u. An end of the V-phase wire bundle 15v of the V-phase coil group 16v is connected to a V-phase connection terminal 17v. An end of the W-phase wire bundle 15w of the W-phase coil group 16w is connected to a W-phase connection terminal 17w. The other ends of the wire bundles 15u, 15v, and 15w of the coil groups 16u, 16v, and 16w are connected to a neutral terminal 18.

Referring to FIG. 4, each coil 14 includes a winding portion 20 in which the wire bundle 15 is annularly wound around the insulator 13 into a layered structure, a first winding end 21 which is an end of the wire bundle 15 at an outer end of the winding portion 20 in the radial direction of the stator 10, and a second winding end 22 which is an end of the wire bundle 15 at an inner end of the winding portion 20 in the radial direction of the stator 10. In the winding portion 20, the wire bundle 15 is wound into a layered structure in which the wire bundle 15 is stacked on itself in the radial direction of the stator 10 such that each wire 15a of the wire bundle 15 extends along a body portion 30 of the insulator 13, which will be described below. The first winding end 21 of each coil 14 is connected to the second winding end 22 of another coil 14 of the same phase with the crossover portion 15T.

Referring to FIGS. 4 to 8, the insulator 13 includes the body portion 30 around which the wire bundle 15 is wound; an outer peripheral flange 31 and an inner peripheral flange 32 provided at the ends of the body portion 30 in the radial direction; an outer separation wall 33 that extends outward in the radial direction from an end of the outer peripheral flange 31 in the axial direction; a first crossover-portion retaining member 41 that projects outward in the axial direction from the outer separation wall 33 and retains a part of the crossover portion 15T that is near the first winding end 21; and a second crossover-portion retaining member 42 that projects outward in the axial direction from an end of the inner peripheral flange 32 in the axial direction and retains a part of the crossover portion 15T that is near the second winding end 22.

The body portion 30 is a tubular portion that is rectangular in cross section, and has a rectangular hole 30a extending therethrough in the radial direction of the stator 10. The body portion 30 includes walls 34 and 35 that are opposed to each other in the axial direction of the stator 10 and walls 36 and 37 that are opposed to each other in the circumferential direction of the stator 10. The size of the rectangular hole 30a is slightly larger than each tooth 11b of the stator core 11, so that the tooth 11b can be inserted thereinto. A plurality of grooves 38 are formed in the walls 36 and 37 so as to extend in the axial direction of the stator 10. The grooves 38 are provided to position the two wires 15a and 15a of the wire bundle 15 when the wire bundle 15 is wound.

Figure 5:
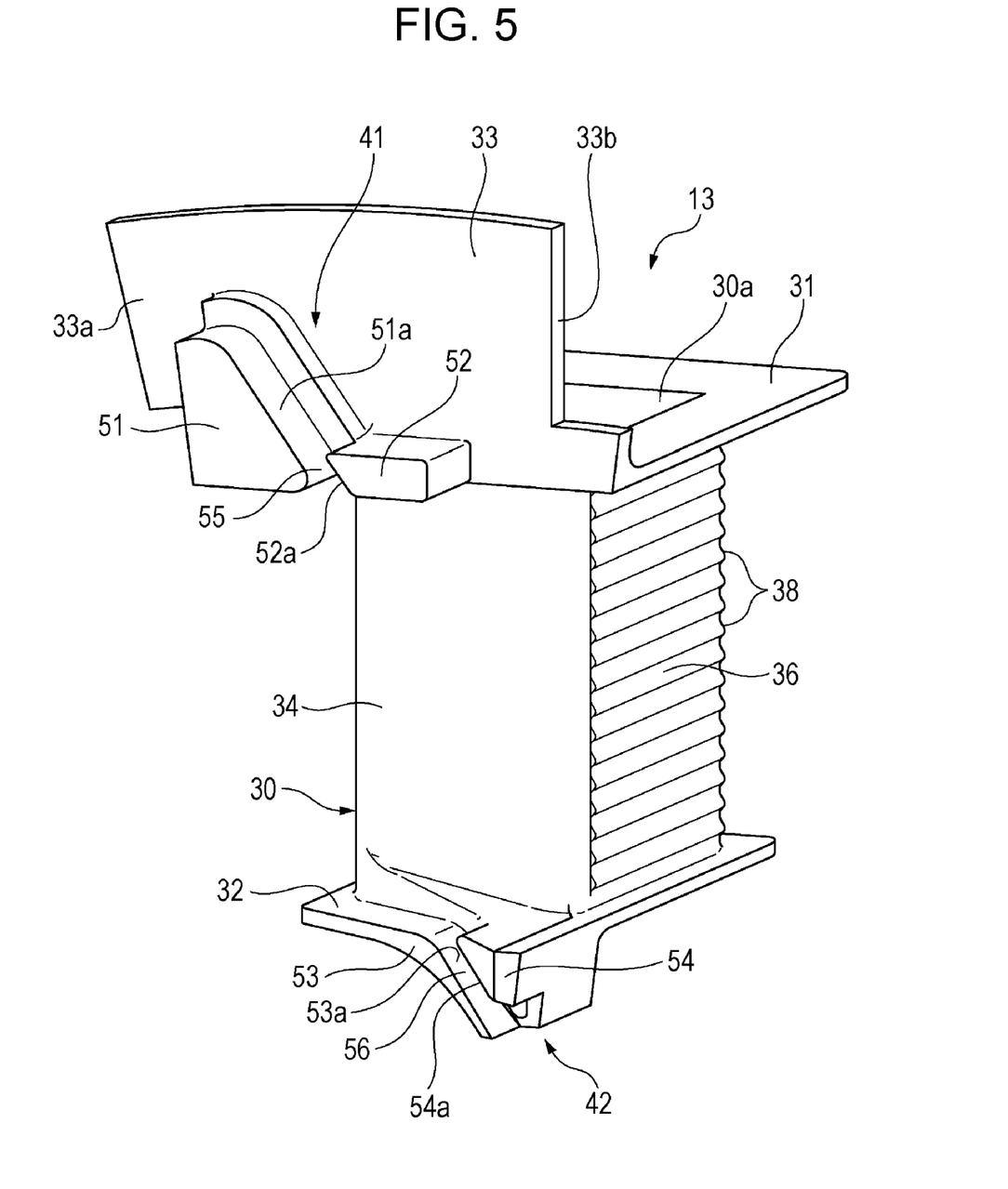
FIG. 5 is a perspective view of an insulator.
Figure 6:
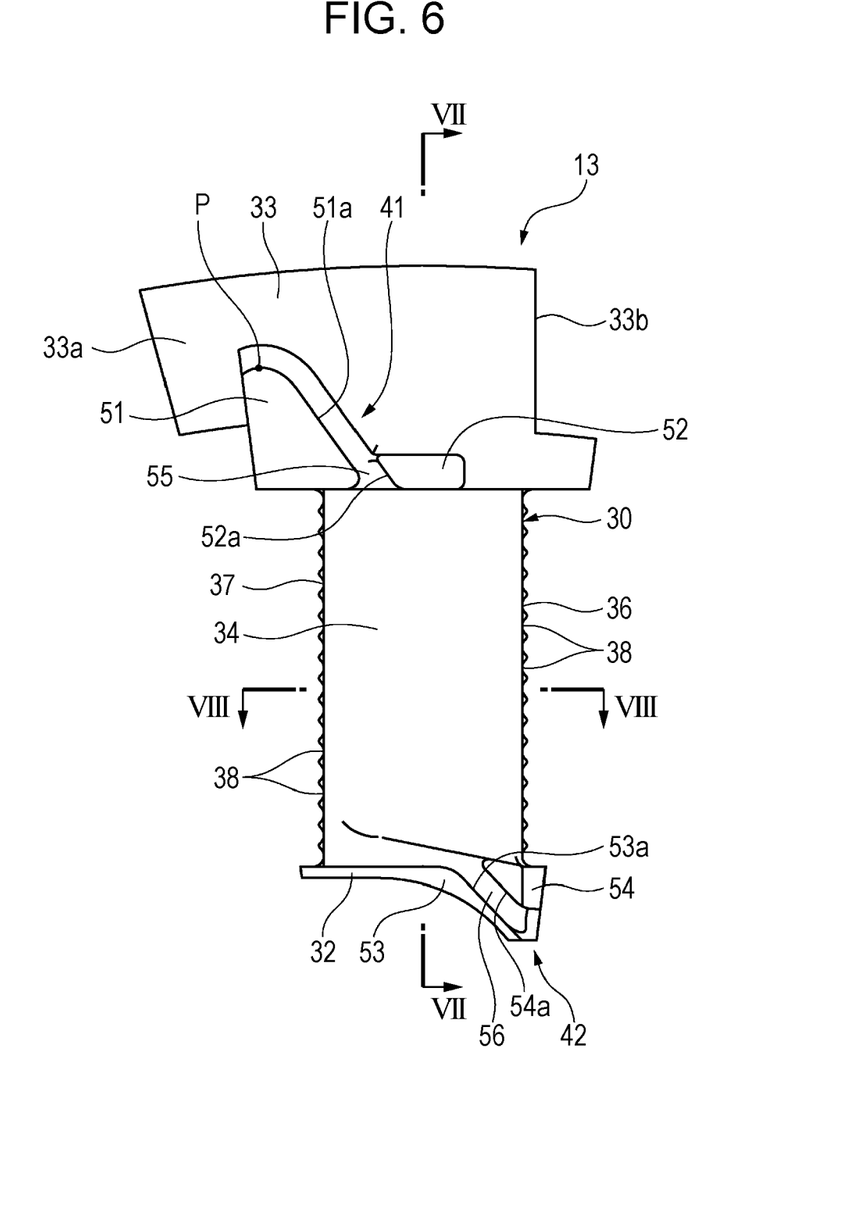
FIG. 6 is a front view of the insulator.
Figure 7:
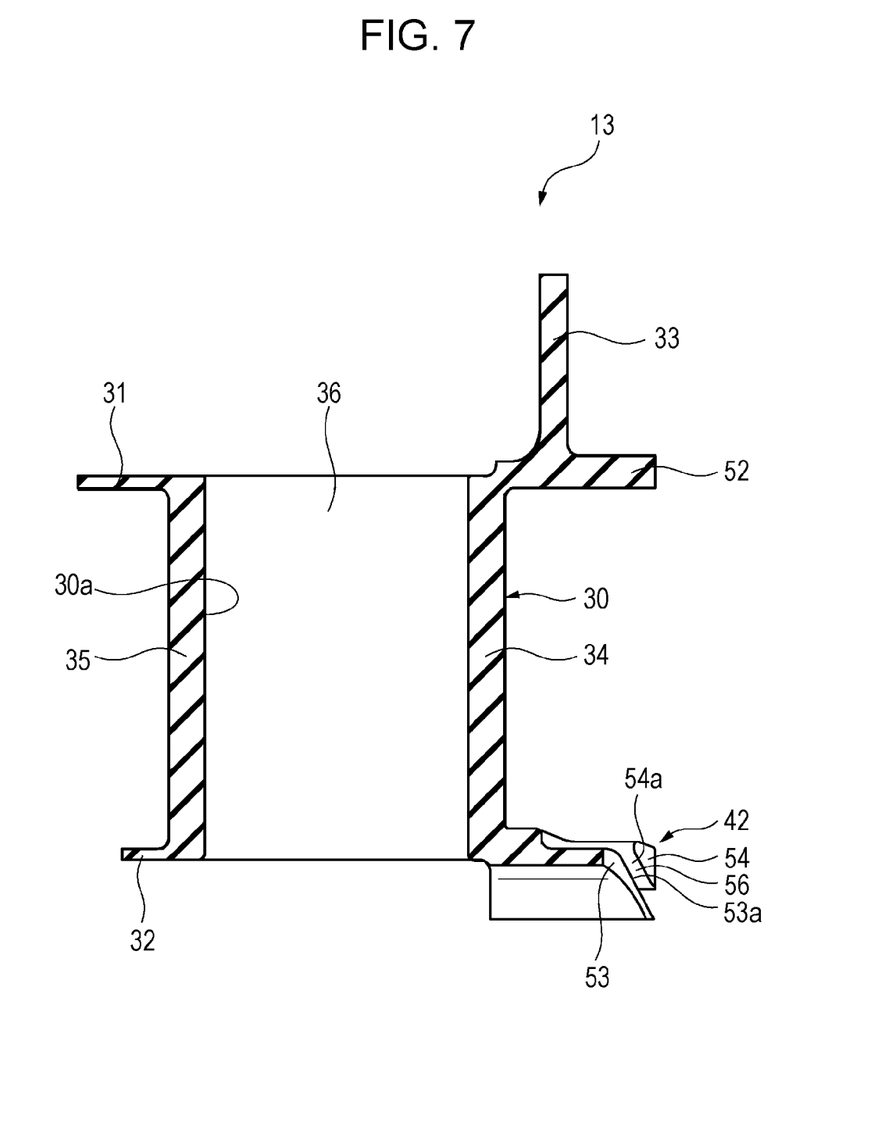
FIG. 7 is a sectional view of FIG. 6 taken along line VII-VII.
Figure 8:
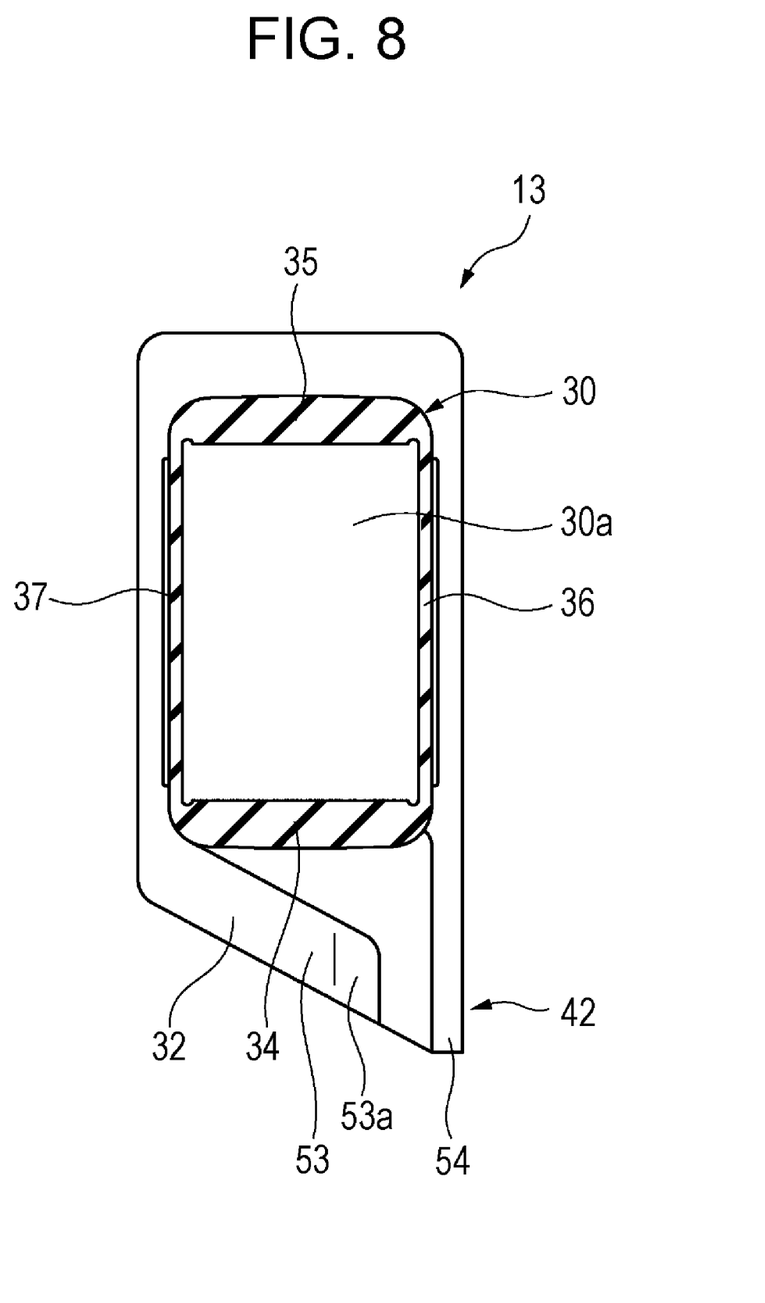
FIG. 8 is a sectional view of FIG. 6 taken along line VIII-VIII.

Referring to FIGS. 4 to 6, an engaging portion 33a that is shaped so as to project outward in the circumferential direction is provided on the outer separation wall 33 at an end thereof in the circumferential direction that is near the first crossover-portion retaining member 41 (left end in FIG. 6). In addition, an engaging portion 33b that is shaped so as to be recessed inward in the circumferential direction is provided on the outer separation wall 33 at an end thereof in the circumferential direction that is separated from the first crossover-portion retaining member 41 (right end in FIG. 6). The engaging portion 33b of each insulator 13 engages with the engaging portion 33a of the insulator 13 adjacent thereto. The engaging portion 33b is formed in a shape that corresponds to the shape of the engaging portion 33a, so that the engaging portion 33b is engageable with the engaging portion 33a.

The first crossover-portion retaining member 41 includes a first binding portion 51, a second binding portion 52, and a retaining groove 55. The first binding portion 51 includes an inclined surface 51a that guides the wire bundle 15 outward in the radial direction of the stator 10 in the same direction as the winding direction of the coil 14. The inclined surface 51a has an upwardly projecting shape with a vertex P at the outer end thereof in the radial direction of the stator 10. The first binding portion 51 retains the crossover portion 15T at the outer end thereof in the radial direction of the stator 10. The second binding portion 52 is disposed so as to face the first binding portion 51 in the circumferential direction of the stator 10, and includes an inclined surface 52a that is parallel to the inclined surface 51a of the first binding portion 51. The second binding portion 52 retains a part of the crossover portion 15T that is retained by the first crossover-portion retaining member 41 at the inner end thereof in the radial direction of the stator 10. The retaining groove 55 that receives the wire bundle 15 is formed between the inclined surfaces 51a and 52a.

The second crossover-portion retaining member 42 includes a third binding portion 53, a fourth binding portion 54, and a retaining groove 56. The third binding portion 53 includes an inclined surface 53a that guides the wire bundle 15 outward in the radial direction of the stator 10 in the same direction as the winding direction of the coil 14. The third binding portion 53 retains the crossover portion 15T. The fourth binding portion 54 is disposed so as to face the third binding portion 53 in the circumferential direction of the stator 10, and includes an inclined surface 54a that is parallel to the inclined surface 53a of the third binding portion 53. The fourth binding portion 54 retains a part of the crossover portion 15T that is retained by the second crossover-portion retaining member 42 at the inner end thereof in the radial direction of the stator 10. The retaining groove 56 that receives the wire bundle 15 is formed between the inclined surfaces 53a and 54a.

Figure 9:
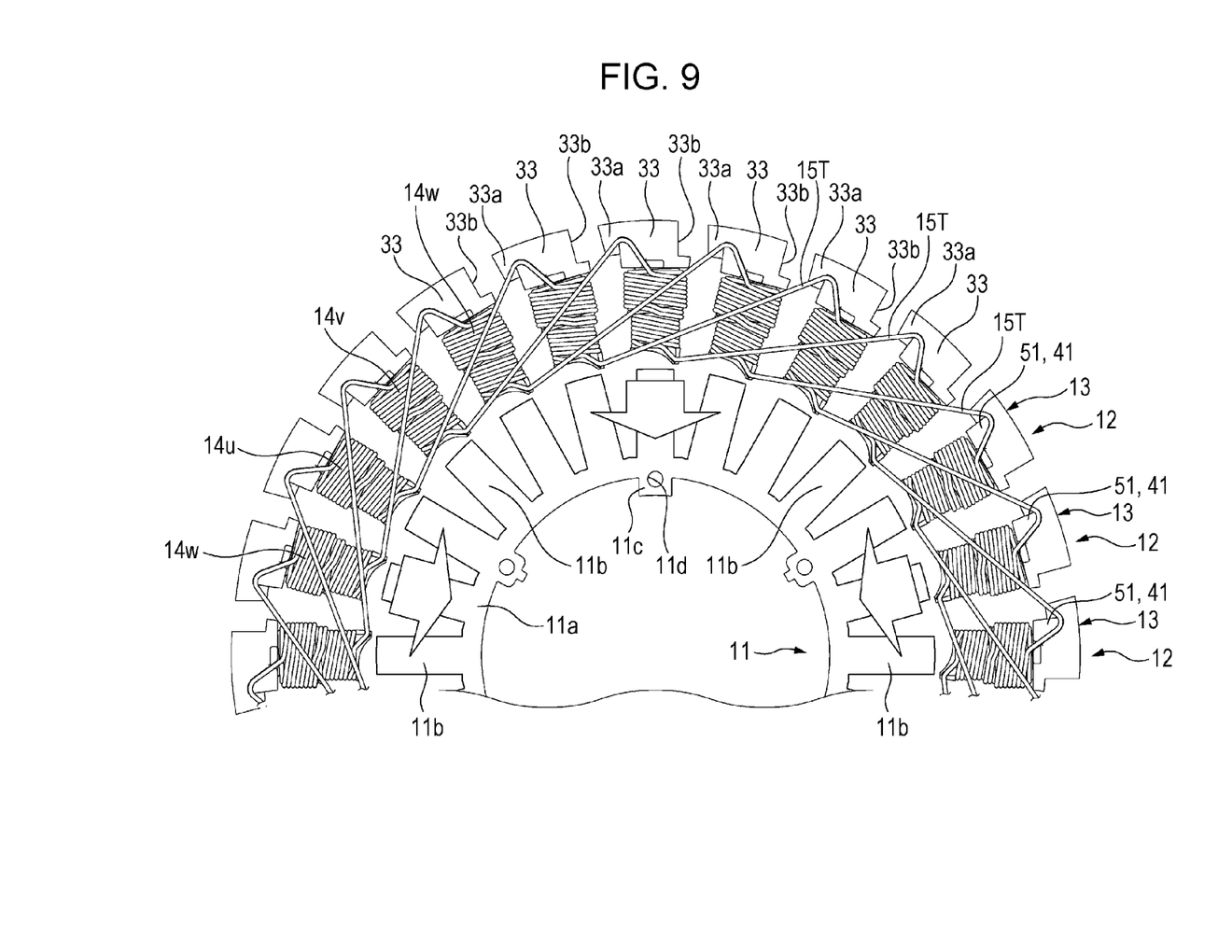
FIG. 9 is an enlarged front view illustrating the manner in which the core pieces are attached to teeth of the stator core.
Figure 10:
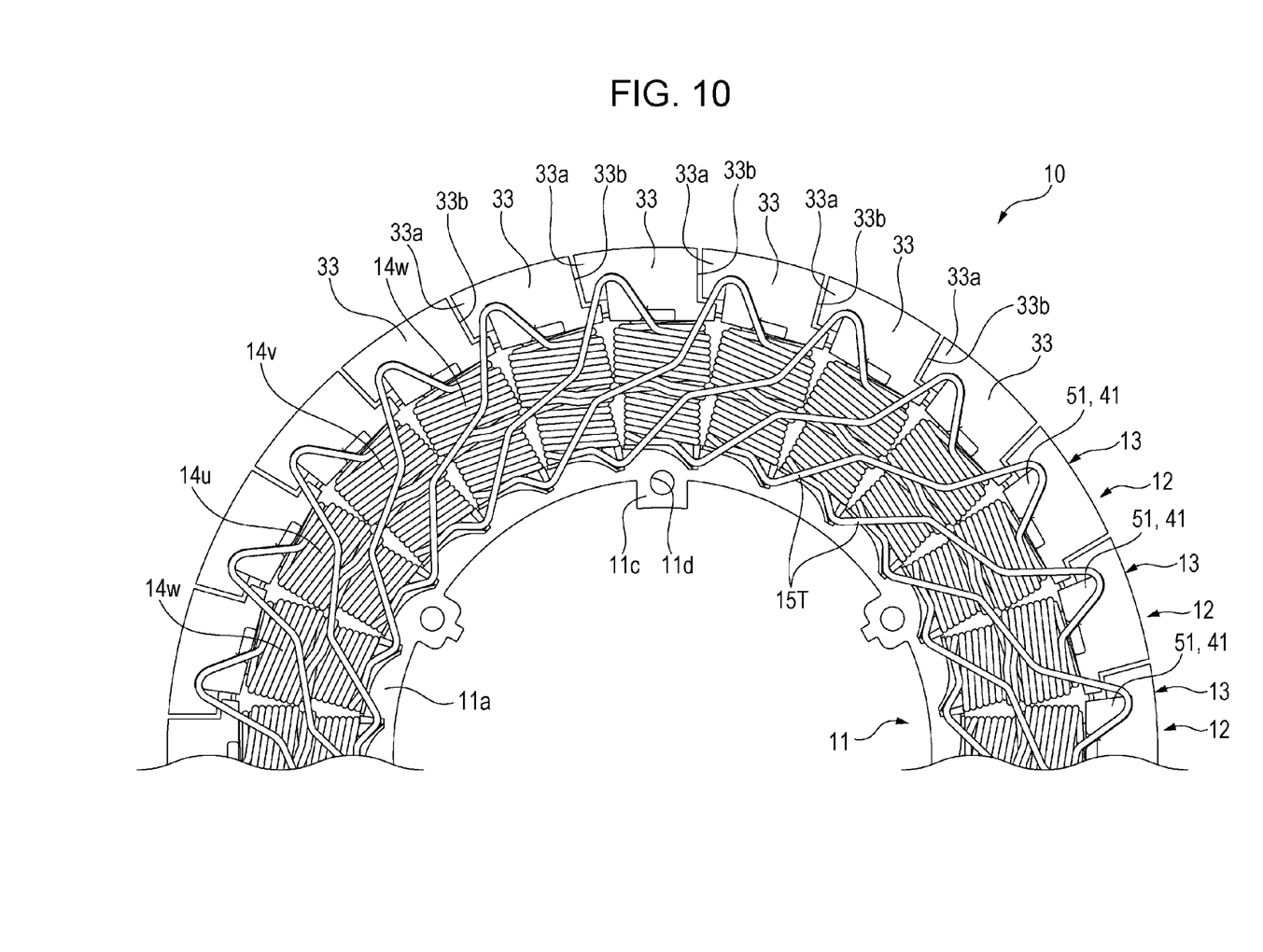
FIG. 10 is an enlarged front view illustrating the state in which the core pieces are attached to the teeth of the stator core and engaging portions of the adjacent insulators are engaged with each other.

As illustrated in FIG. 9, the twenty-four core pieces 12 (insulators 13) having the above-described structure are attached to the twenty-four teeth 11b of the stator core 11 such that the teeth 11b are inserted into the respective core pieces 12. Accordingly, as illustrated in FIG. 10, the engaging portions 33a and the engaging portions 33b of the adjacent insulators 13 are engaged with each other. More specifically, the engaging portion 33a of each insulator 13 is engaged with the engaging portion 33b of the insulator 13 at one side thereof in the circumferential direction (left side in FIG. 10), and the engaging portion 33b of each insulator 13 is engaged with the engaging portion 33a of the insulator 13 at the other side thereof in the circumferential direction (right side in FIG. 10). Thus, each insulator 13 is restrained from moving outward in the radial direction by the insulator 13 that is adjacent thereto. As a result, the insulators 13 are prevented from being pulled out in the radial direction.

In the present embodiment, the twenty-four core pieces 12 (insulators 13) that are arranged in an annular configuration are attached to the twenty-four teeth 11b of the stator core 11 from the outer side in the radial direction such that the teeth 11b are inserted into the respective core pieces 12. Accordingly, each crossover portion 15T becomes excessively long by an amount corresponding to a reduction in the length of the crossover portion 15T in the circumferential direction. As illustrated in FIG. 10, the excess length of each crossover portion 15T is absorbed and a tension is applied to the crossover portion 15T by bending the crossover portion 15T into a substantially S-shaped form. Accordingly, the tension applied to the crossover portions 15T is applied to the insulators 13 through the first binding portion 51 as a radially inward force. As a result, the insulators 13 are more reliably prevented from being pulled out in the radial direction.

In the present embodiment, each crossover portion 15T is retained by the first binding portion 51 that has an upwardly projecting shape including the vertex P. Thus, the part of each crossover portion 15T that is retained by the first crossover-portion retaining member 41 is more strongly bent than the part of the crossover portion 15T that is retained by the second crossover-portion retaining member 42. Therefore, the shape of the crossover portion 15T in the bent state is reliably maintained. As a result, the insulators 13 are more reliably prevented from being pulled out in the radial direction.

As described above, in the outer-rotor salient-pole concentrated winding motor 1 according to the present embodiment, the engaging portions 33a and the engaging portions 33b of the insulators 13 that are adjacent to each other engage with each other when the insulators 13 are attached to the teeth 11b such that the teeth 11b are inserted thereinto. Therefore, the insulators 13 can be restrained, against the springback force, from moving outward in the radial direction. Thus, the insulators 13 are prevented from being pulled out from the teeth 11b. As a result, the insulators 13 are reliably prevented from coming into contact with the rotor 4.

In addition, in the outer-rotor salient-pole concentrated winding motor 1 according to the present embodiment, the part of each crossover portion 15T that is retained by the first crossover-portion retaining member 41 is more strongly bent than the part of the crossover portion 15T that is retained by the second crossover-portion retaining member 42. Therefore, the shape of the crossover portion 15T in the bent state is reliably maintained, so that the crossover portion 15T can endure the tension applied thereto.

In addition, in the outer-rotor salient-pole concentrated winding motor 1 according to the present embodiment, the engaging portion 33a is provided on an end surface of each outer separation wall 33 at an end in the circumferential direction that is near the first crossover-portion retaining member 41. Therefore, the strength of the engaging portion 33a can be increased.

Figure 11:
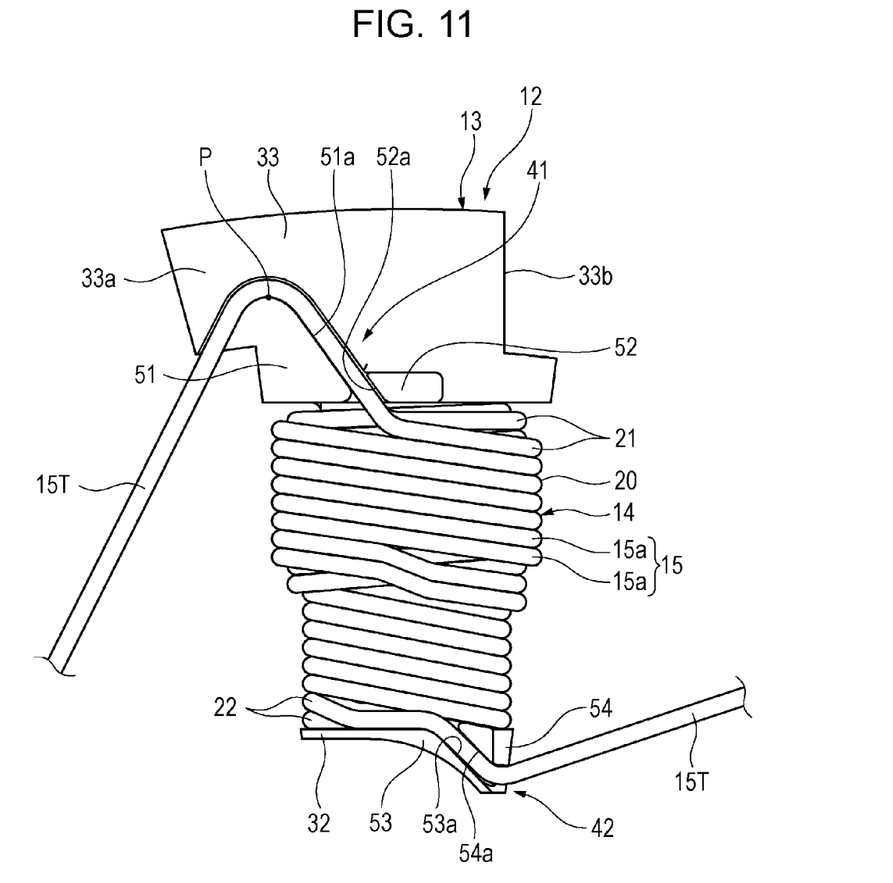
FIG. 11 is a front view of a core piece illustrating a modification of the insulator.

FIG. 11 illustrates a modification of the present embodiment. As illustrated in FIG. 11, the binding portion 51 may be formed such that an outer end thereof in the circumferential direction extends to the engaging portion 33a. According to this modification, the shape of the crossover portion 15T is easily maintained and the crossover portion 15T can more reliably endure the tension applied thereto. As a result, the insulators 13 can be more strongly fixed to each other.

The present invention is not limited to the above-described embodiment, and various modifications are possible within the scope of the present invention.

For example, in the present embodiment, the engaging portion 33a is formed at a specific end of the outer separation wall 33 in the circumferential direction and the engaging portion 33b is formed at the other end in the circumferential direction. However, the present invention is not limited to this. The engaging portion 33b may instead be formed at the specific end of the outer separation wall 33 in the circumferential direction and the engaging portion 33a may be formed at the other end in the circumferential direction.

In addition, in the above-described embodiment, each coil and each crossover portion are formed of a wire bundle including two wires. However, the present invention is not limited to this, and each coil and each crossover portion may be formed of a single wire or a wire bundle including three or more wires.

According to the embodiment of the present invention, an outer-rotor salient-pole concentrated winding motor (for example, an outer-rotor salient-pole concentrated winding motor 1) includes a salient-pole concentrated winding stator (for example, a salient-pole concentrated winding stator 10) and a rotor (for example, a rotor 4). The salient-pole concentrated winding stator includes a stator core (for example, a stator core 11) having a plurality of teeth (for example, teeth 11b) that extend outward in a radial direction; coils (for example, coils 14) which each include a winding portion (for example, a winding portion 20) formed by annularly winding a wire (for example, a wire bundle 15) into a layered structure, a first winding end (for example, a first winding end 21) which is an end of the wire at an outer end of the winding portion in the radial direction of the stator, and a second winding end (for example, a second winding end 22) which is an end of the wire at an inner end of the winding portion in the radial direction of the stator; and insulators (for example, insulators 13) that retain the respective coils and that are connected to each other in an annular configuration such that the teeth are inserted into the insulators and such that the first winding end of each coil is connected to the second winding end of another coil with a crossover portion (for example, a crossover portion 15T). The rotor includes a rotor holder (for example, a support member 5) and a rotor yoke (for example, a rotor yoke 6) fixed to an inner peripheral surface of the rotor holder. The salient-pole concentrated winding stator and the rotor are arranged so as to face each other with a gap therebetween in the radial direction. Each insulator includes a body portion (for example, a body portion 30) around which the wire is wound; an outer peripheral flange (for example, an outer peripheral flange 31) provided at an outer end of the body portion in the radial direction; an inner peripheral flange (for example, an inner peripheral flange 32) provided at an inner end of the body portion in the radial direction; an outer separation wall (for example, an outer separation wall 33) that extends outward in the radial direction from an end of the outer peripheral flange in an axial direction; a first crossover-portion retaining member (for example, a first crossover-portion retaining member 41) that is provided on the outer separation wall and retains a part of the crossover portion that is near the first winding end; a second crossover-portion retaining member (for example, a second crossover-portion retaining member 42) that is provided on the inner peripheral flange and retains a part of the crossover portion that is near the second winding end; a projecting engaging portion (for example, an engaging portion 33a) that is provided on the outer separation wall at an end thereof in a circumferential direction and shaped so as to project outward in the circumferential direction; and a recessed engaging portion (for example, an engaging portion 33b) that is provided on the outer separation wall at the other end thereof in the circumferential direction and shaped so as to be recessed inward in the circumferential direction. The projecting engaging portions and the recessed engaging portions of the adjacent insulators engage with each other when the teeth are inserted into the insulators.

According to the embodiment of the present invention, the projecting engaging portions and the recessed engaging portions of the insulators that are adjacent to each other engage with each other when the insulators are attached to the teeth such that the teeth are inserted thereinto. Therefore, the insulators can be restrained, against the springback force, from moving outward in the radial direction. Thus, the insulators are prevented from being pulled out from the teeth. As a result, the insulators are reliably prevented from coming into contact with the rotor.

In the above-described structure, preferably, the part of the crossover portion that is retained by the first crossover-portion retaining member is more strongly bent than the part of the crossover portion that is retained by the second crossover-portion retaining member.

In such a case, the shape of the crossover portion is reliably maintained, so that the crossover portion can endure the tension applied thereto.

In the above-described structure, preferably, each projecting engaging portion is provided on an end surface of the outer separation wall at an end in the circumferential direction that is near the first crossover-portion retaining member.

In such a case, the strength of each projecting engaging portion can be increased.

In the above-described structure, preferably, the first crossover-portion retaining member includes a binding portion (for example, a binding portion 51) that has a projecting shape with a vertex (for example, a vertex P) at the outer end in the radial direction of the stator and that retains a part of the crossover portion that is near the first winding end, the binding portion being formed so as to extend to the projecting engaging portion.

In such a case, since the binding portion is formed so as to extend to the projecting engaging portion, the shape of the crossover portion is easily maintained and the crossover portion can more reliably endure the tension applied thereto. As a result, the insulators can be more strongly fixed to each other.

Obviously, numerous modifications and variations of the present invention are possible in light of the above teachings. It is therefore to be understood that within the scope of the appended claims, the invention may be practiced otherwise than as specifically described herein.

What is claimed is:

1. An outer-rotor salient-pole concentrated winding motor comprising:
    a salient-pole concentrated winding stator comprising:
        a stator core having a plurality of teeth that extend outward in a radial direction of the stator core;
        coils each comprising:
            a winding portion formed by annularly winding a wire into a layered structure;
            a first winding end which is an end of the wire at an outer end of the winding portion in the radial direction of the stator; and
            a second winding end which is an end of the wire at an inner end of the winding portion in the radial direction of the stator; and
        insulators retaining the coils and connected to each other in an annular configuration such that the teeth are inserted into the insulators and such that the first winding end of one of the coils is connected to the second winding end of another of the coils with a crossover portion; and
    a rotor comprising:
        a rotor holder; and
        a rotor yoke fixed to an inner peripheral surface of the rotor holder;
    the salient-pole concentrated winding stator and the rotor being arranged to face each other with a gap between the salient-pole concentrated winding stator and the rotor in the radial direction;
    each of the insulators comprising:
        a body portion around which the wire is wound;
        an outer peripheral flange provided at an outer end of the body portion in the radial direction;
        an inner peripheral flange provided at an inner end of the body portion in the radial direction;
        an outer separation wall extending outward in the radial direction from an end of the outer peripheral flange in an axial direction;
        a first crossover-portion retaining member provided on the outer separation wall and retaining a part of the crossover portion located in a vicinity of the first winding end;

a second crossover-portion retaining member provided on the inner peripheral flange and retaining a part of the crossover portion located in a vicinity of the second winding end;

a projecting engaging portion provided at one end of the outer separation wall in a circumferential direction and projecting outward in the circumferential direction;

a recessed engaging portion provided at another end of the outer separation wall in the circumferential direction and formed so that the outer separation wall is recessed inward in the circumferential direction; and the projecting engaging portion and the recessed engaging portion of adjacent insulators among the insulators engaging with each other when the teeth are inserted into the insulators.

2. The outer-rotor salient-pole concentrated winding motor according to claim 1, wherein the part of the crossover portion retained by the first crossover-portion retaining member is more sharply bent than the part of the crossover portion retained by the second crossover-portion retaining member.

3. The outer-rotor salient-pole concentrated winding motor according to claim 1, wherein the projecting engaging portion is provided at an end surface of the outer separation wall at an end in the circumferential direction in a vicinity of the first crossover-portion retaining member.

4. The outer-rotor salient-pole concentrated winding motor according to claim 1, wherein the first crossover-portion retaining member includes a binding portion to retain a part of the crossover portion in a vicinity of the first winding end, the binding portion having a projecting shape with a vertex at the outer end in the radial direction of the stator and being formed so as to extend to the projecting engaging portion.

5. The outer-rotor salient-pole concentrated winding motor according to claim 1, wherein the crossover portion is bent into a substantially S-shaped form when the teeth are inserted into the insulators so that a tension is applied to the crossover portion.

* * * * *